(12) United States Patent
Crites

(10) Patent No.: US 6,379,567 B1
(45) Date of Patent: Apr. 30, 2002

(54) CIRCULAR HYDRO-PETROLEUM SEPARATION FILTER

(76) Inventor: Thomas Randall Crites, 666 Old Stage Rd., Salinas, CA (US) 93901

(*) Notice: Subject to any disclaimer, the term of this patent is extended or adjusted under 35 U.S.C. 154(b) by 0 days.

(21) Appl. No.: 09/642,493

(22) Filed: Aug. 18, 2000

(51) Int. Cl.[7] .................. B01D 17/038; B01D 21/26
(52) U.S. Cl. .................. 210/788; 210/800; 210/806; 210/512.1; 210/532.1; 210/538; 210/539; 209/715; 209/725; 55/459.1
(58) Field of Search .................. 210/512.1, 532.1, 210/538, 539, 788, 800, 806; 209/715, 725; 55/459.1

(56) References Cited

U.S. PATENT DOCUMENTS 5,186,836 A * 2/1993 Gauthier et al. ......... 210/512.1
6,190,543 B1 * 2/2001 Christiansen ............ 210/512.1

* cited by examiner

Primary Examiner—David A. Reifsnyder
(74) Attorney, Agent, or Firm—LaRiviere, Grubman & Payne, LLP

(57) ABSTRACT

A submerged filtering device for separating any mixture of two immiscible fluids having different specific gravities. The filter can be used with either a gravity or pumped in-feed flow, and can be constructed in a range of sizes from easily transportable units to large fixed installations. When separating a mixture of oil and water, the filter operates in an external holding tank of water, which has the higher specific gravity, in which it is nearly entirely submerged. The filter uses a combination of hydro-static pressure and head pressure to exploit the difference in specific gravity of the two fluids, efficiently effecting a separation.

15 Claims, 6 Drawing Sheets

→⊗→ RAW FLUID
→○→ WATER
→×→ OIL

CIRCULAR HYDRO-PETROLEUM SEPARATION FILTER

TECHNICAL FIELD OF THE INVENTION

The present invention relates to a mechanical filter which separates a fluid flow of a mixture of oil and water into separate components which can then be further managed. The filter can be deployed as either a fixed or transportable unit and sized to separate either a small or large volume flow of mixed oil and water.

BACKGROUND ART

Conventional methods for separating a fluid mixture of oil and water involve placing the mixture in a tank or other container until the oil floats to the top of the tank where it may be skimmed off. One commonly used separator is referred to as an "API" separator and consists of a relatively long, narrow tank, frequently open-topped, in which the mixture enters at one end in a continuous flow and is removed at the other end by the oil flowing out an upper discharge and the water flowing out a lower discharge. Other approaches use either open or closed top tanks which hold the mixture until the oil separates by floating to the top. After a predetermined time, the water and possibly any sediments are removed from the bottom of the tank and the oil is removed from the top, then the tank is refilled for another cycle.

Biological treatment systems are also used to consume oil from oil-water mixtures but have a relatively slow process time. Other approaches include additions of chemical or steam to aggregate or evaporate the oil component. These systems are not energy efficient and require external sources of chemicals or steam. What is needed is a flow-through filter which requires minimal additional support or supplies and quickly and efficiently separates petroleum hydrocarbons from water.

BRIEF DISCLOSURE OF THE INVENTION

The present invention is an improved filtering device for separating any mixture of two immiscible fluids having different specific gravities, such as separating a raw fluid mixture of oil and water into two relatively pure fluids which can then be separately managed. The filter can be used with either a gravity or pumped in-feed flow, and can be constructed in a range of sizes from easily transportable units to large fixed installations. When separating a mixture of oil and water, the filter operates in an external holding tank of water, which has the higher specific gravity, in which it is nearly entirely submerged. The filter uses a combination of hydrostatic pressure and head pressure to exploit the difference in specific gravity of the two fluids, efficiently effecting a separation.

BRIEF DESCRIPTION OF THE DRAWINGS

For a fuller understanding of the present invention, reference is made to the a accompanying drawings. In the Drawings:

FIG. 2 is a vertical section view of the Filter of FIG. 1 along line AA' of FIG. 2a.

FIG. 3 is a perspective view of the vertical section of FIG. 2 along line BB' of FIG. 3a.

FIG. 4 is a perspective view of a cut-away of the upper half of the Filter of FIG. 1 along line CC' of FIG. 3a.

FIG. 5a is a view of the Filter of FIG. 1 including line DD'.

FIG. 5 is a perspective view of a cut-away of the mid section of the Filter of FIG. 1 along line CC' of FIG. 3a.

BEST MODE FOR CARRYING OUT THE INVENTION

The present invention is an improved filtering device for separating any immiscible mixture of two fluids having different specific gravities, such as separating a raw fluid mixture of oil and water into two relatively pure fluids. The following description of the preferred embodiment of the present invention uses terminology appropriate for the separation of oil from water. It is to be understood, however, that the filter has broader application to the separation of any mixture of two immiscible fluids having different specific gravities as will be apparent to anyone knowledgeable in the fluid separation arts. The Applicant recognizes that the present invention may also be described as a separator rather than as a filter.

Figure 1:
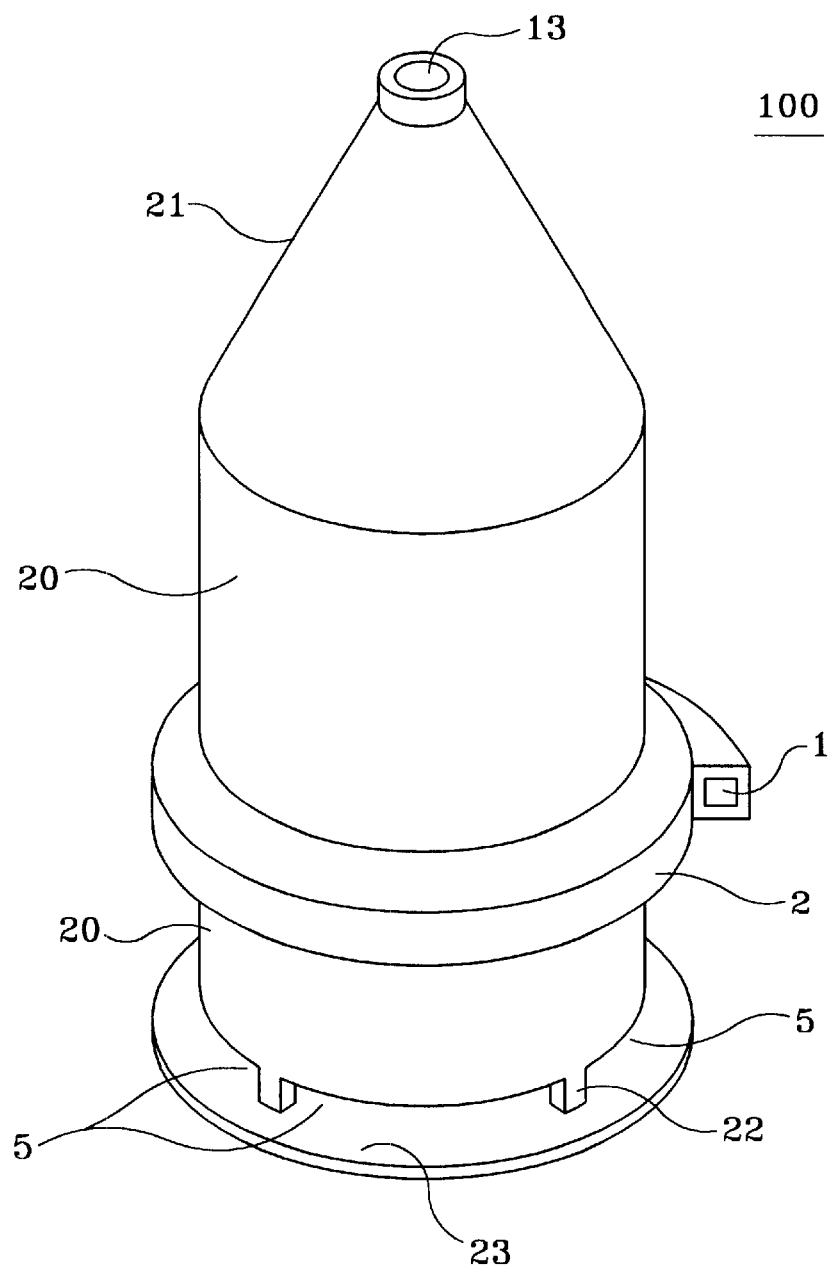
FIG. 1 is a perspective view of the external features of a filter constructed in accordance with the present invention.

FIG. 1 shows a perspective view of the exterior housing of the filter 100 of the present invention. The external housing is comprised of cylinder 20 and generally conical top 21. These units are typically made of stainless steel but may alternatively be made of other metals such as aluminum or mild steel or of fibre reinforced plastics or other moldable non-reactive polymeric materials. Top 21 may alternatively be of any tapered shape which is amenable to manufacture in the materials chosen for its construction. Reference herein to conical is not intended to limit the form of the top to a smooth cone. Conical top 21 can be adapted for use on existing oil-water separation units and is of any conical shape so long as the tapered sides displace enough water to discharge the separated oil. Outer ring 2 forms a channel and is disposed on the exterior of cylinder 20 at approximately the midpoint of the vertical cylindrical wall. This height can be varied, measured from the bottom of cylinder 20, between 25% to 75% of the height of cylinder 20 without varying from the principles of the present invention. The positioning of outer ring 2 affects the height of the interior components as will be described below.

In-feed port 1 of ring 2 is adapted to-be attached to a conduit such as a pipe or hose through which the mixture to be separated is introduced to filter 100. If, for instance, filter 100 is to be used as a transportable unit, port 1 may preferably be configured to detachably accept a hose. In the instance of a fixed installation, port 1 may preferably be configured to be more permanently attached to a pipe. The dimensions of port 1 and ring 2 may be chosen depending on the through-put rate desired for the filter. Typical dimensions are ¾ inch for a through-put of 20 gallons per minute for example. The range of through-put of which filter 100 is capable is believed to be from 10 gallons per minute to 2,000 gallons per hour but higher through-puts may be achieved by a larger, multistage filter based on the teaching of the present invention. Ring 2 is open to the interior of filter 100 throughout its length. Ring 2 serves to divert the linear in-feed flow from the supplying conduit into a circular flow around cylinder 20, thereby delivering the mixture to be separated throughout the interior of filter 100. Ring 2 is shown on the outside of the housing but could also be formed internally if desired.

Cylinder 20 is generally open at the bottom and extends above tank bottom 23 by means of legs 22. The height above bottom 23 may vary between ½ inch and 4 inches, depending on the through-put of filter 100. The through-put and consequently the height above the bottom 23 is a function of the diameter of in-feed port 1 and the pump pressure behind the in-feed stream. The gaps between cylinder 20 and bottom 23 form water discharge points 5. A minimum of three legs 22 are used for stability but more may be used. Alternatively, the function of legs 22 and discharge points 5 may be achieved by a plurality of holes along the lower circumference of cylinder 20, as long as a generally unrestricted area at the bottom of cylinder 20 is provided for discharge of the separated heavier fluid.

Conical top 21 is in the form of a truncated cone, having vent 13 at the apex. Vent 13 may preferably be open as shown, for venting and keeping the apparatus at ambient pressure, but may alternatively be configured to detachably accept a conduit for discharging fluids as will be described later. For example, if the lighter separating phase of the mixture has a high or otherwise objectionable vapor pressure, vent 13 may be configured to conduct vapors to an environmental control device. If reasons exist for the filter to operate as a closed unit, vent 13 may be configured to accept a conduit to convey off the lighter separating fluid phase.

Figure 2A:
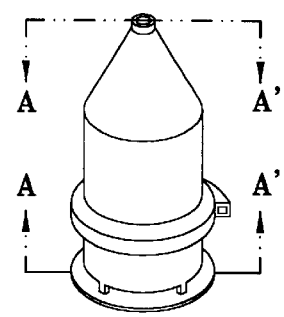
FIG. 2a is a view of the Filter of FIG. 1 including line AA'.
Figure 2:
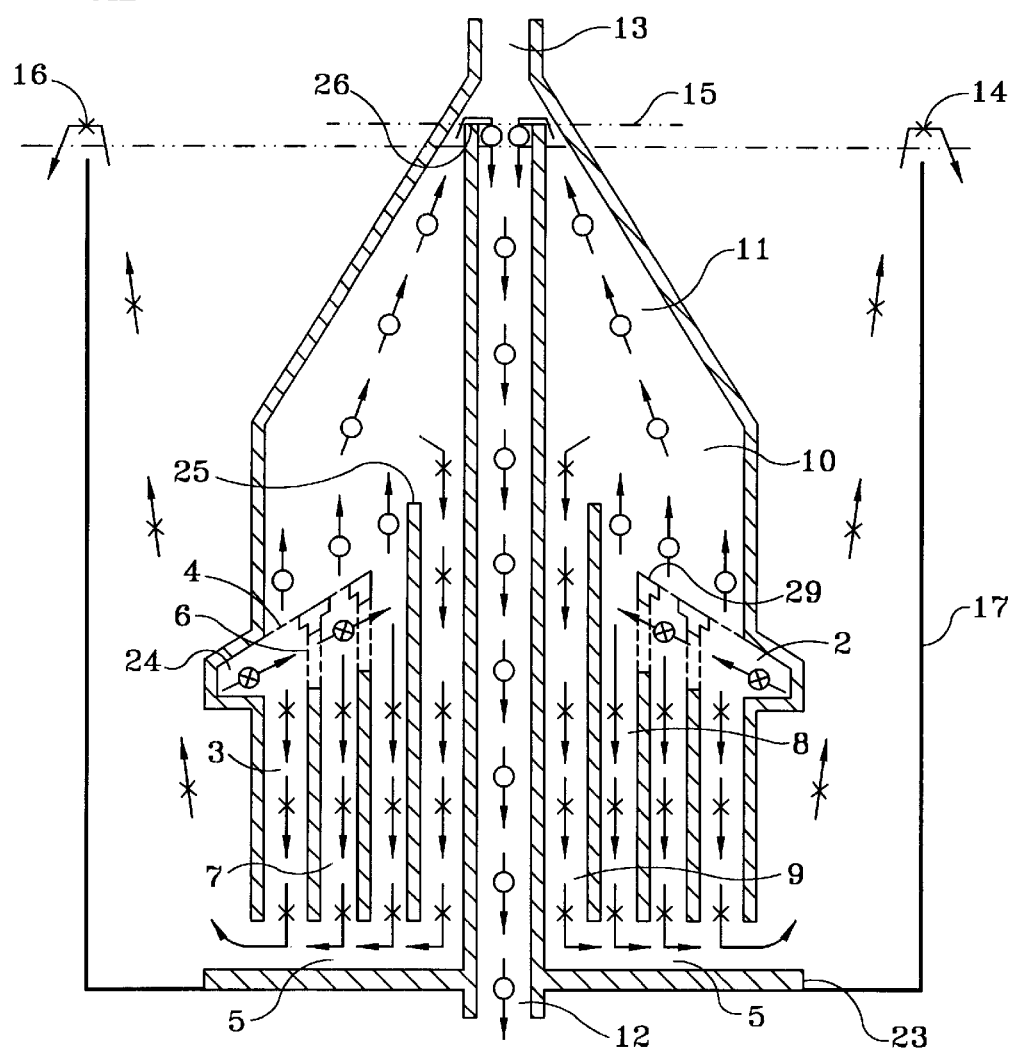

FIG. 2 is a vertical section view of filter 100 along the line AA' as indicated in figure 2A. Filter 100 is disposed within holding tank 17 which forms an integral part of the unit. Tank 17 is sized to surround filter 100 and extend to the vicinity of vent 13 as shown, and may be either open topped as shown or closed top if necessary, as for environmental concerns. Tank 17 has a discharge 16 which controls the level of fluid in tank 17. While shown schematically as located at the outer periphery of tank 17, discharge 16 can be located anywhere necessary for operation of filter 100, such as a standpipe, or multiple discharge points. The depth of the water in tank 17 determines the hydrostatic pressure at the water release points 5 and in the separation chambers described below and may be varied, if desired for specific operations, by relocating discharge 16 to establish a new fluid level. A range of pressures may be generated by raising water line 14 with a corresponding increase in the height of vent 13 and oil discharge tube 12 top 26. Tank 17 may be made of metal or a polymeric material such as fibre reinforced plastic, either of which is compatible with and sealable to the materials of filter 100. In use, tank 17 is filled with the heavier of the two fluids to be separated. In the case of oil and water, tank 17 would preferably be filled with water at the start of the filtering operation. If necessary, filter 100 could be operated at a reduced throughput until tank 17 accumulated sufficient water to reach discharge 16. Alternatively, discharge 16 could be recycled, that is, routed back to the source of the oil-water mixture to be separated, until the filter is operating at the desired capacity and efficiency, then discharge 16 could be diverted from recycle to the desired discharge water process or system.

The mixture to be separated, hereinafter referred to as raw fluid, enters filter 100 through port 1 and circulates through ring 2 as described above. Ring 2 has a sloped top 24 as shown to allow any of the lighter fluid that separates within ring 2 to escape into holding area 10. The slope of top 24 is identical to and reflected in other components described below. Ring 2 distributes the raw fluid into concentric primary chamber 3 which occupies the outer periphery of cylinder 20. Raw fluid fills and circulates around chamber 3, slowing somewhat in the process. The raw fluid starts to separate, oil floating toward the top and water settling toward the bottom. The water flows out the bottom, exiting filter 100 through discharge 5 points at the bottom of cylinder 20. If the discharged water contains some oil, the water may be recycled from tank discharge 16 as described above until the filter begins to operate at the desired efficiency. Oil separating from the raw fluid escapes at the top of chamber 3 and collects in holding area 10. The separated oil will rise to the top of holding area 10 to approximately the water level 14 determined by tank discharge 16.

Primary chamber 3 is separated from concentric secondary chamber 7 by a cylindrical wall having a lip generally above the lower level of ring 2. This portion of filter 100 is shown in more detail and described more fully below in reference to FIGS. 3–5. Raw fluid is partially separated in chamber 3, then over flows into secondary chamber 7. Secondary chamber 7 is similar to primary chamber 3, circular in shape, open at the bottom and top. The raw fluid continues to separate in chamber 7 as described above for chamber 3, then overflows the interior wall 29 of chamber 7 into a third stage, final chamber 8. The interior wall 29 of chamber 7 is higher than but similar to that of chamber 3 as described below. Additional secondary chambers 7 may be necessary if a high volume raw fluid flow or a high oil to water ratio raw fluid is to be treated. In this event, each inwardly successive interior wall 29 will be higher in the same proportion as described below. The secondary chambers allow the circular force of the in-feed to dissipate so that the relative motion of the two phases of the raw fluid is primarily vertical. Final chamber 8 completes the separation step and has the tallest interior wall in the form of a vertical pipe, water displacement tube 9.

While the preferred embodiment has chambers 3, 7 and 8 arranged concentrically, an alternative helical arrangement is also contemplated by the present invention as possibly advantageous for some applications. In a helical configuration, the overflow from one chamber to the next would be configured in much the same manner as described herein for concentric chambers.

Tube 9 is axially disposed in the center of filter 100 and has a smaller, longer tube, oil discharge tube 12, disposed centrally within. The top 25 of tube 9 extends above the slope defined by outer ring 2 sloped top 24 and the walls of secondary chamber 7. Water tube 9 top 25 is generally disposed midway between outer ring 2 top 24 and the bottom of conical top 21 but may be at any point from the top of wall 29 to the bottom of conical top 21. Top 25 of tube 9 defines the maximum working volume of oil that the filter may hold. If the volume of oil is increased without providing for an outlet through tube 12, oil will be forced to discharge through tube 9, recontaminating the separated water phase. In practice, the ideal water level will generally be between top 25 and the midpoint of conical top 21. As oil enters holding area 10, excess water is forced down tube 9 and out of filter 100. The lower end of tube 9 is open to the tank 17 bottom and allows remaining separated water to leave the filter.

Oil separating from the raw fluid in chambers 3, 7 and 8 is subject to hydrostatic pressure determined by the difference in level between water level 14 and the interface inside filter 100 between the oil and water phases. The oil rises through holding area 10 defined by conical top 21. As the oil rises, it is concentrated around top 26 of oil discharge tube 12 by the reduced surface area of tapered oil discharge section 11. Top 26 is disposed generally above water line 14 defined by tank discharge 16. Top 26 is typically ½ to 2 inches above water line 14 but may be located at the waterline, depending on the weight of oil being separated. In this case tapered oil discharge 11 must be primed to operate properly. Oil rising under hydrostatic pressure through holding area 10 forces oil at the oil discharge level 15 to over flow top 26 and enter discharge tube 12 where it flows out of filter 100 for further management. The closer waterline 14 is to top 26, the faster oil is discharged. Holding area 10 is a buffer between tapered oil discharge 11 and separation chambers 3, 7 and 8. The height of holding area 10 determines the hydrostatic pressure in the separation chambers and is typically equal to the height of cylinder 20 below the in-feed port 1, but may vary from the height of wall 29 upward, creating the desired hydrostatic pressure on water discharge 5.

If filter 100 is to be operated as a portable unit, tank 17 may be suspended from a gravity erect framework of gimbals which would allow the unit to remain upright, even if mounted on a moving platform, such as a ship or another mobile transporter. In this case the height of holding area 10 is determined by the side to side movement of the holding tank.

Vent 13 is normally open to the atmosphere, allowing filter 100 to operate at ambient atmospheric pressure. The area of vent 13 is generally equal to the area of top 26 to oil discharge tube 12. Vent 13 may alternatively be fitted for attachment to a further treatment process such as an environmental control device. If desirable, air may be entrained in the raw fluid just prior to entry into filter 100 to aid in the separation action and the entrained air can escape through vent 13.

Figure 6A:
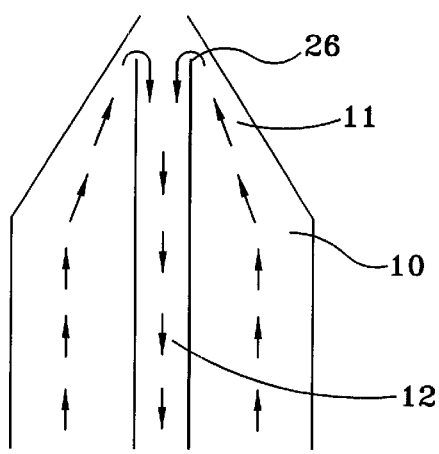
FIGS. 6a, 6b and 6d are three figures showing three modes of the internal fluid flow of the Filter of FIG. 1 along line EE' of FIG. 6c.
Figure 6C:
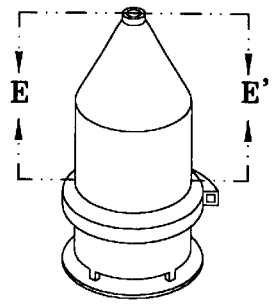
FIG. 6c is a view of the Filter of FIG. 1 including line EE'.
Figure 6B:
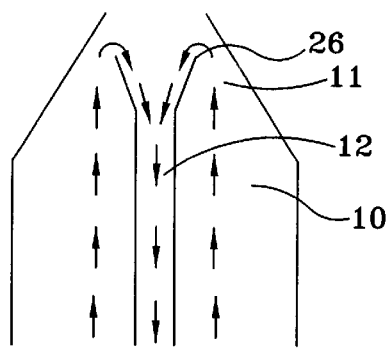
Figure 6D:
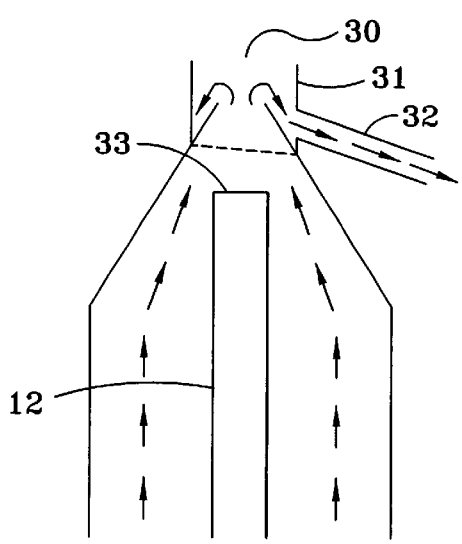

In some applications, it may be desirable for the oil to be discharged through vent 13 instead of through tube 12 as shown in FIG. 6D. In this instance vent 13 is fitted so as to accept a conduit for removal of the separated oil and tube 12 is closed off by a cap 33 at top 26 (or a shut-off valve somewhere exterior to filter 100). If a top oil discharge is utilized, a generally round tube 31, larger in diameter than vent 13 and fitted with an oil discharge tube 32 at the bottom is placed at the top of filter 100, covering vent 13. Gases are then discharged out the top and oil out of tube 32. For proper functioning of filter 100 in this configuration, tube 12 must remain in place to avoid formation of a whirl pool in the center of filter 100 which will allow oil to be captured and forced out of the water discharge ports 5.

If additional air is entrained in the raw fluid feed, it enhances the discharge of oil and reduces the hydrostatic pressure in the filter above the in-feed port 1. The entrained air acts as a facilitator to enhance the flow of oil out of filter 100. The water in tank 17 exerts a constant pressure on water discharge 5. The pressure below port 1 in filter 100 increases until the pressure equals that at the point of discharge 5. Head pressure change inside tapered oil discharge 11 is minimal and self-adjusting by the accumulation of oil inside conical top 21. All discharges, vent 13, oil discharge 12 and water discharge 5 are oversized to accommodate a throughput of 100% oil, water, or air. Changes in the volume of oil being separated cause a fluctuation of both hydrostatic pressure and head pressure above port 1.

Figure 3A:
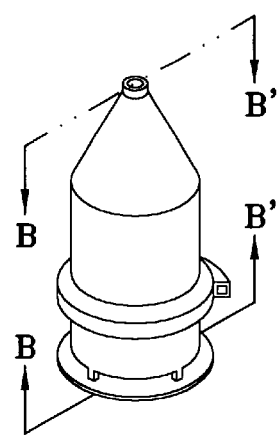
FIG. 3a is a view of the Filter of FIG. 1 including line BB'.
Figure 3:
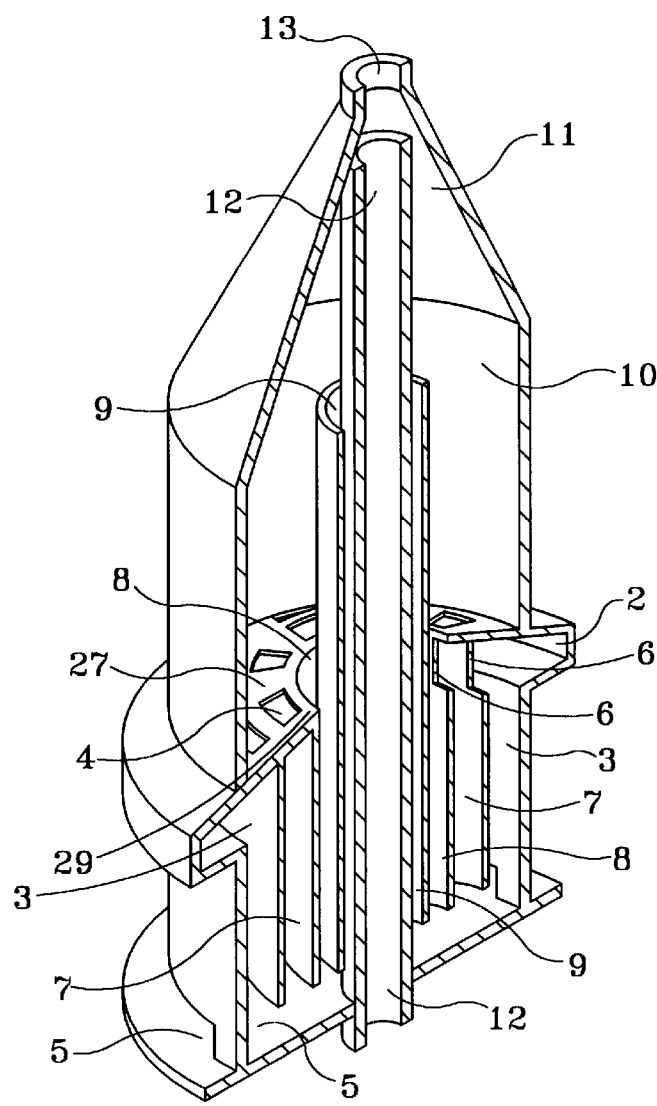
Figure 4A:
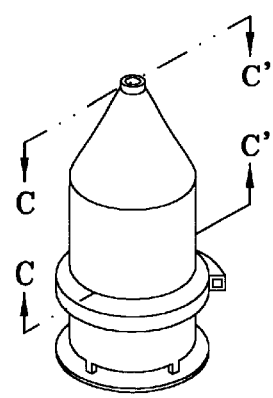
FIG. 4a is a view of the Filter of FIG. 1 including line CC'.
Figure 4:
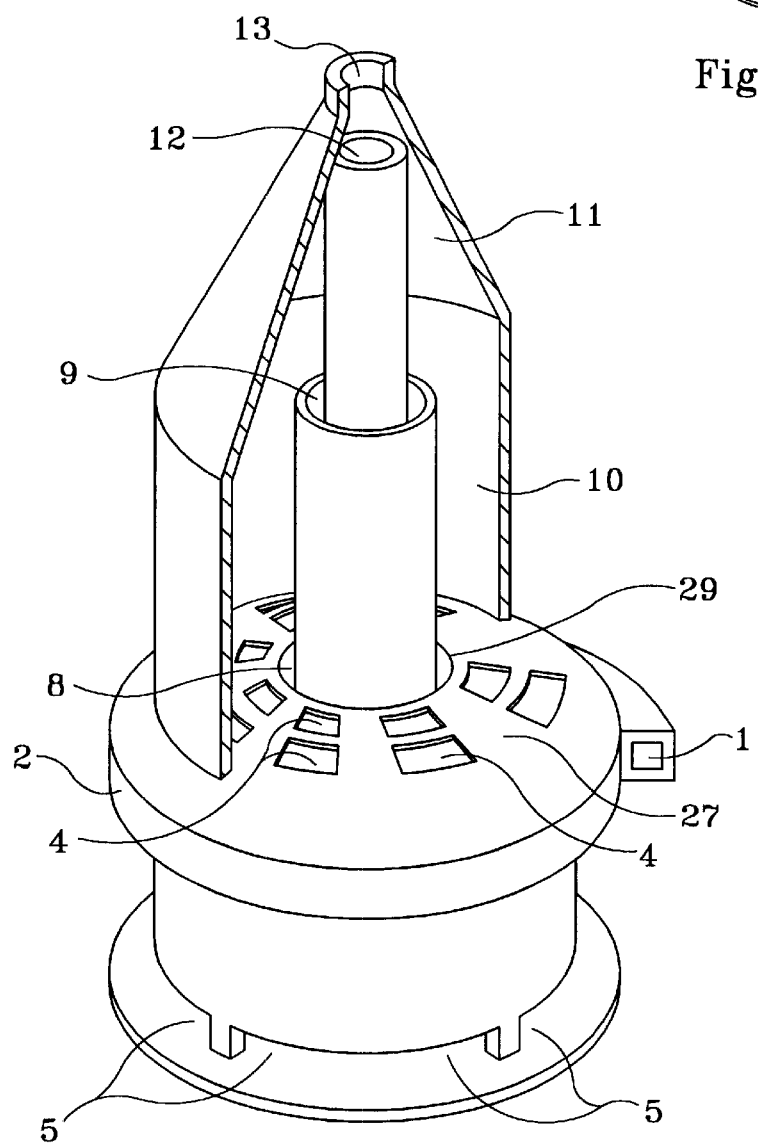

FIGS. 3 and 4 are cut away perspective views, along lines BB' and CC' as shown in FIGS. 3A and 4A respectively, of the top area of separation chambers 3, 7 and 8. Chambers 3 and 7 are defined at the top by a cover made of web 27 and oil release ports 4. The web serves to restrain the flow of oil so that more efficient separation occurs. This cover is oriented in a slope defined by sloped top 24 of ring 2, described above, and forms a projection thereof. As the oil separates in chambers 3 and 7, it rises through ports 4 and enters holding area 10. A plurality of ports 4 is required so that the oil is not impeded as it separates from the raw fluid. Web 27 serves primarily to connect and stabilize the walls forming chambers 3, 7 and 8. Ports 4 are equal sections, equally spaced around the top of the separation chambers. Final chamber 8 is not enclosed at the top as is shown. Rather, it is fully open so that there is nothing to catch and retain any residual oil at this point.

Figures 5, 5A:
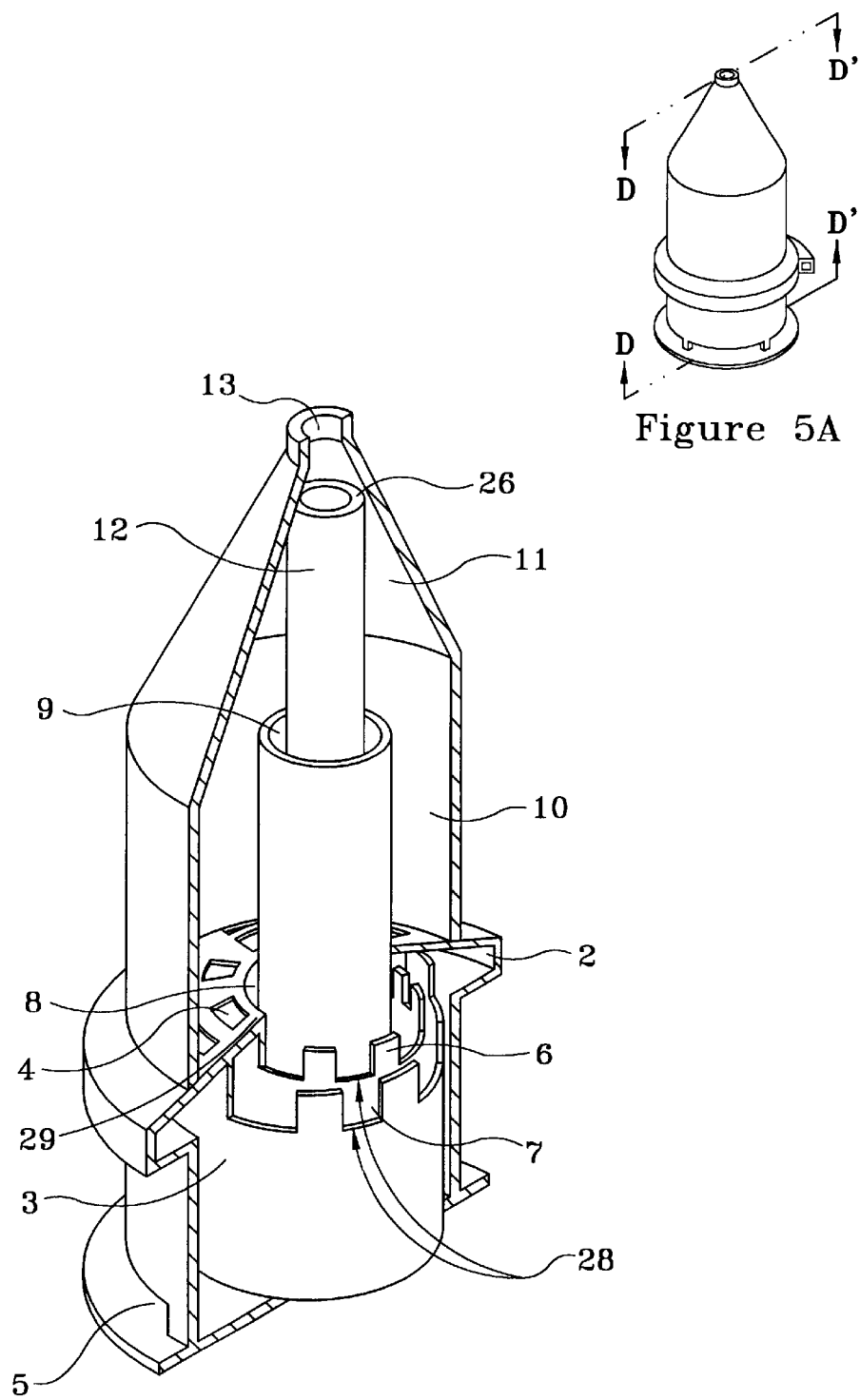

FIG. 5 is a sectional view, along lines DD' indicated in FIG. 5A, of the middle of filter 100 under the top defined by web 27 and ports 4. Decelerators 6 form a castellated upper rim of decelerators 6 and intervening lips 28 to the walls separating the treatment chambers. Decelerators 6 are rectangular and generally equal in area to the gaps there between. Decelerators 6 are attached to webs 27, securing the partitions between chambers 3, 7 and 8. The gaps between decelerators 6 allow the lighter oil phase and some of the water phase to overflow at lip 28 from one chamber to the next. Decelerators 6 also serve to slow down and disrupt the circular motion of the raw fluid as it is forced into the filter 100 and from chamber to chamber, thereby stilling the flow so that the oil can better rise to the top within filter 100. Decelerators 6 and lips 28 are of uniform dimension and reflect the ascending slope of sloped top 24 and the cover defined by web 27. This presents a profile in which the threshold between chambers increases in height from the outer chamber 3 toward the inner chamber 8, starting at the bottom of ring 2 and rising to the inner wall of final chamber 8, shown best in FIG. 2.

FIG. 6 is a sectional view, along lines EE' indicated in FIG. 6C, of the upper end of conical top 21 showing in 6A and 6B two forms which oil tube top 26 may take. Preferably, top 26 is a straight sided extension of tube 12 as depicted in FIG. 6A. Alternatively, a double-taper top 26' may be utilized when a higher volume oil discharge is needed. The maximum oil discharge rate, by volume, is achieved when the diameter at top 26' approaches the diameter of tapered oil discharge 11 near the apex of conical top 21. FIG. 6D shows an alternative, top-discharge configuration as described above.

The present invention has been particularly shown and described with respect to certain preferred embodiments of features thereof. However, it should be readily apparent to those of ordinary skill in the art that various changes and modifications in form and details may be made without departing from the spirit and scope of the invention as set forth in the appended claims.

What is claimed is:

1. An apparatus for separating a fluid mixture of two immiscible fluids having different specific gravities, comprising:

a vertical cylindrical housing having a truncated open-topped generally conical top section, said housing containing at least one concentric cylindrical compartment for separating the fluid mixture into a heavier fluid and a lighter fluid, said housing and compartment being open on the bottom;

at least one tube for conducting the lighter separated immiscible fluid disposed concentrically within the housing within the compartment, the tube reaching from the bottom of the housing to a point near the top of the conical section;

a channel open to the interior of the housing for distributing the fluid mixture to the concentric cylindrical compartment formed on the external wall of the housing medially between the bottom of the housing and bottom of the conical section, said channel having an input for receiving a flow of the fluid mixture to be separated; and a tank having a bottom surrounding the housing for receiving the heavier fluid and having a means for delivery of the heavier fluid for further management.

2. The apparatus of claim 1 wherein the housing has at least two compartments having successively inwardly-ascending tops having restricted-openings therein.

3. The apparatus of claim 2 wherein the compartments are arranged in an inwardly-spiraling helix.

4. The apparatus of claim 1 wherein the housing has two concentric tubes for conducting the separated immiscible fluids, the innermost tube for conducting the lighter fluid being longer and reaching from the bottom of the housing to a point near the top of the conical section.

5. The apparatus of claim 4 wherein the conical top section is open at the top and the longer of the concentric tubes extends generally to the top of the conical section and is open at the top, said longer tube extending through the tank bottom and having an opening at the bottom adapted to attach to a conduit to carry fluid away from the apparatus.

6. The apparatus of claim 5 wherein the longer tube is closed and the conical top section is adapted to attach to a conduit to carry fluid away from the device.

7. The apparatus of claim 1 wherein the tank has an open top.

8. The apparatus of claim 2 wherein the compartment tops comprise a castellated rim between the compartments and a cover comprised of a web and opening structure.

9. The apparatus of claim 8 wherein the vertical cylindrical housing extends above the compartment tops.

10. The apparatus of claim 1 wherein the channel is adapted to receive air with the fluid mixture to be separated.

11. A method for separating a fluid mixture of two immiscible fluids having different specific gravities, comprising:

providing a vertical cylindrical housing having a truncated open-topped generally conical top section, said housing containing at least one concentric cylindrical compartment for separating the fluid mixture into a heavier fluid and a lighter fluid, said housing and compartments being open on the bottom;

providing two concentric tubes for conducting the separated immiscible fluids disposed concentrically within the housing within the innermost compartment, the innermost tube for conducting the lighter fluid being longer and reaching from the bottom of the housing to a point near the top of the conical section;

providing a channel open to the interior of the housing for distributing the fluid mixture to the first of the concentric cylindrical compartments formed on the external wall of the housing medially between the bottom of the housing and bottom of the conical section, said channel having an input for receiving a flow of the fluid mixture to be separated; and providing a tank having a bottom surrounding the housing for receiving the heavier fluid and delivery of the heavier fluid for further management.

12. The method of claim 11 wherein the housing has at least two compartments having successively inwardly-ascending open tops having restricted openings therein.

13. The method of claim 11 wherein the conical top section is open at the top and wherein the housing has two concentric tubes for conducting the separated immiscible fluids, the longer of the concentric tubes is open at the top, said longer tube extending through the tank bottom and having an opening at the bottom adapted to attach to a conduit to carry fluid away from the apparatus.

14. The method of claim 13 wherein the longer tube is closed at the top and the conical top section is adapted to attach to a conduit to carry fluid away from the apparatus.

15. The method of claim 11 wherein air is introduced into the fluid to be separated.

* * * * *